(12) United States Patent
Jeon (10) Patent No.: US 9,483,135 B2
(45) Date of Patent: Nov. 1, 2016

(54) ORGANIC LIGHT EMITTING DISPLAY INTEGRATED WITH TOUCH SCREEN PANEL

(71) Applicant: Samsung Display Co., Ltd., Yongin, Gyeonggi-do (KR)

(72) Inventor: Mu-Kyung Jeon, Yongin (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 123 days.

(21) Appl. No.: 13/920,459

(22) Filed: Jun. 18, 2013

(65) Prior Publication Data

US 2014/0210736 A1    Jul. 31, 2014

(30) Foreign Application Priority Data

Jan. 31, 2013 (KR) .................. 10-2013-0011083

(51) Int. Cl.
*G06F 3/041* (2006.01)
(52) U.S. Cl.
CPC ................... *G06F 3/0412* (2013.01)
(58) Field of Classification Search
CPC .................. G09G 3/30–3/3291; G06F 3/041; G06F 3/0412
See application file for complete search history.

(56) References Cited

U.S. PATENT DOCUMENTS

| | | | |
|---|---|---|---|
| 8,686,926 B2 | 4/2014 | Han et al. | |
| 2005/0139821 A1* | 6/2005 | Park | 257/40 |
| 2005/0140306 A1 | 6/2005 | Park | |
| 2011/0273397 A1* | 11/2011 | Hanari | 345/174 |
| 2012/0249454 A1* | 10/2012 | Teraguchi et al. | 345/173 |
| 2013/0321292 A1 | 12/2013 | Jeon | |

FOREIGN PATENT DOCUMENTS

| | | |
|---|---|---|
| KR | 10-2005-0065947 | 6/2005 |
| KR | 10-2012-0008085 | 1/2012 |
| KR | 10-2013-0136187 | 12/2013 |

* cited by examiner

*Primary Examiner* — Matthew Sim
(74) *Attorney, Agent, or Firm* — Knobbe Martens Olson & Bear LLP (57) ABSTRACT

An organic light emitting display can be integrated with a touch screen panel, in which control lines arranged in the touch screen panel are used as driving electrodes of a mutual capacitive touch screen panel, and a signal applied to the control lines in a touch recognition operation is input in synchronization with the signal applied to a display panel without having influence on the display. The control lines used as driving electrodes of the touch screen panel can be electrically connected to auxiliary lines arranged close to sensing electrodes of the touch screen panel, thereby improving touch recognition sensitivity.

18 Claims, 4 Drawing Sheets

ORGANIC LIGHT EMITTING DISPLAY INTEGRATED WITH TOUCH SCREEN PANEL

CROSS-REFERENCE TO RELATED APPLICATIONS

This application claims priority to and the benefit of Korean Patent Application No. 10-2013-0011083, filed on Jan. 31, 2013, in the Korean Intellectual Property Office, the entire content of which is incorporated herein by reference.

BACKGROUND

1. Field

An aspect of the present invention relates to an organic light emitting display, and more particularly, to an organic light emitting display integrated with a touch screen panel.

2. Description of the Related Technology

A touch screen panel is an input device that allows a user's instruction to be input by selecting an instruction content displayed on a screen of a display device or the like, with a user's hand or object.

To this end, the touch screen panel is formed on a front face of the display device to convert a contact position into an electrical signal. The user's hand or object is directly in contact with the touch screen panel at the contact position. Accordingly, the instruction content selected at the contact position is input as an input signal to the image display device.

Since such a touch screen panel can be substituted for a separate input device coupled to a display device, such as a keyboard or mouse, its application fields have been gradually extending.

Touch screen panels are divided into a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing pattern and an adjacent sensing pattern or ground electrode when a user's hand or object comes in contact with the touch screen panel.

Generally, such a touch screen panel is commercialized by being attached to an outer face of a flat panel display such as a liquid crystal display or organic light emitting display.

However, in a case where the touch screen panel is attached to the outer face of the flat panel display, an adhesive layer between the touch screen panel and the flat panel display is necessary, and a manufacturing process of the touch screen panel is required separately from the flat panel display. Therefore, process time and process costs are increased.

Further, the touch screen panel is typically attached to the outer face of the flat panel display, and therefore, the entire thickness of the flat panel display is increased.

SUMMARY OF CERTAIN INVENTIVE ASPECTS

Embodiments provide an organic light emitting display integrated with a touch screen panel of the organic light emitting display, in which control lines arranged in the touch screen panel are used as driving electrodes of a mutual capacitive touch screen panel, and a signal applied to the control lines in a touch recognition operation is input in synchronization with the signal applied to a display panel without having influence on the display.

Embodiments also provide an organic light emitting display integrated with a touch screen panel, in which control lines used as driving electrodes of the touch screen panel are electrically connected to auxiliary lines arranged close to sensing electrodes of the touch screen panel, thereby improving touch recognition sensitivity.

According to an aspect of the present invention, there is provided an organic light emitting display integrated with a touch screen panel comprising a plurality of first electrodes, the display including: a first substrate on which a plurality of pixels, a plurality of signal lines and a plurality of control lines are arranged, wherein each of the plurality of signal lines and each of the plurality of control lines are coupled to a respective pixel of the plurality of pixels; a second substrate on the first substrate to seal the first substrate, said second substrate having a surface on which the first electrodes of the touch screen panel are arranged; and a plurality of auxiliary lines, each of the plurality of auxiliary lines electrically coupled to a respective control line of the plurality of control lines, the auxiliary lines formed closer to the first electrodes than the control lines, wherein each of the plurality of control lines and each of the plurality of auxiliary lines are arranged in a direction intersecting a respective first electrode so as to function as a second electrode of the touch screen panel.

Each of the auxiliary lines may be formed to have a width wider than that of each of the control lines electrically coupled thereto. The auxiliary lines may be formed in the same layer as an anode electrode of an organic light emitting diode provided in each pixel. The auxiliary lines may be made of the same material as the anode electrode.

The auxiliary lines may be configured to be separated from the anode electrode. The auxiliary lines may be further provided with at least one protrusion protruded to a region between the anode electrodes.

A plurality of adjacent control lines may form one group, and each of the plurality of control lines constituting the group may be operated as a second electrode of the touch screen panel. The first electrode may be a sensing electrode of the touch screen panel, and the second electrode may be a driving electrode of the touch screen panel.

The first electrodes may be formed on a display area of the second substrate, corresponding to the region on which the pixels are formed. Sensing lines through which the first electrodes are coupled to a touch driving circuit through a first touch pad portion may be further formed on a non-display area positioned at the outside of the display area.

The control lines may be coupled to the touch driving circuit through a second touch pad portion formed on a non-display area of the first substrate.

The first touch pad portion formed on the second substrate may be coupled to the same touch driving circuit as the second touch pad portion formed on the first substrate.

The control lines may include initialization driving control lines providing an initialization voltage to the respective pixels.

Each pixel may include an organic light emitting diode; a first transistor configured to control the amount of current supplied to the organic light emitting diode, and having a gate electrode of which voltage is initialized by the initialization voltage; and a second transistor coupled between the gate electrode of the first transistor and the control line providing the initialization voltage.

The initialization voltage applied to the control line may be lower than a data signal applied to each pixel. The initialization voltage may be progressively applied for each group of control lines, operated as the second electrode of the touch screen panel. A high-level voltage may be simultaneously applied the other groups of control lines except the group of control lines to which the initialization voltage is applied.

A cathode electrode of the organic light emitting diode may be provided between the plurality of auxiliary lines arranged on the first substrate and the first electrodes formed on the one surface of the second substrate, and the cathode electrode may have an opening formed in a region overlapping with the auxiliary lines to expose the auxiliary lines.

As described above, according to the present invention, control lines arranged on a touch screen panel of an organic light emitting display are used as driving electrodes of a mutual capacitive touch screen panel, thereby implementing the organic light emitting display integrated with the touch screen panel having a thin thickness without any additional process.

Further, a signal applied to the control lines in a touch recognition operation is input in synchronization with the signal applied to a display panel without having influence on the display, thereby performing display and touch recognition at the same time.

Further, control lines used as driving electrodes of the touch screen panel are electrically connected to auxiliary lines arranged close to sensing electrodes of the touch screen panel, thereby improving touch recognition sensitivity.

BRIEF DESCRIPTION OF THE DRAWINGS

The accompanying drawings, together with the specification, illustrate certain embodiments of the present invention, and, together with the description, serve to explain the principles of the present invention.

DETAILED DESCRIPTION OF CERTAIN INVENTIVE EMBODIMENTS

Hereinafter, certain embodiments according to the present invention will be described with reference to the accompanying drawings. When a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals generally refer to like elements throughout.

Figure 1:
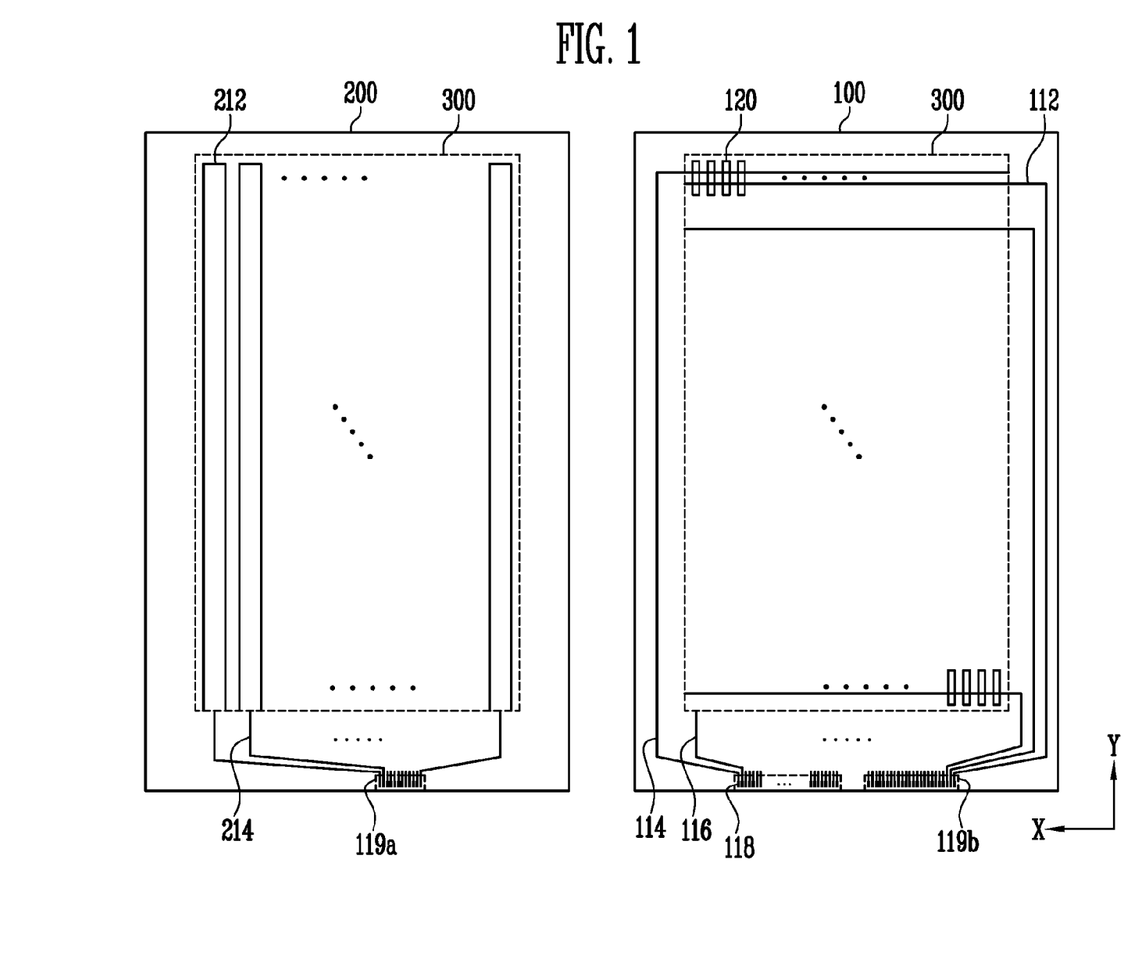
FIG. 1 is a separate plan view of an organic light emitting display integrated with a touch screen panel according to an embodiment of the present invention.

FIG. 1 is a separate plan view of an organic light emitting display integrated with a touch screen panel according to an embodiment of the present invention.

Embodiments provide an organic light emitting display integrated with a touch screen panel, in which first electrodes (sensing electrodes) 212 of the touch screen panel are formed directly on one surface of an upper substrate 200 of the organic light emitting display, and second electrodes (driving electrodes) of the touch screen panel are implemented as control lines 112 arranged on a lower substrate 100 of the organic light emitting display device.

The upper substrate 200 serves as an encapsulation substrate of the organic light emitting display. The upper substrate 200 may be made of a glass substrate or may be implemented in the form of a thin film having flexibility.

One surface of the upper substrate 200 may become an outer surface of the upper substrate. Accordingly, one surface of the upper substrate 200 shown in FIG. 1 corresponds to the outer surface of the upper substrate.

However, this is merely one embodiment of the present invention, and the embodiments of the present invention are not limited thereto. The first electrodes 212 of the touch screen panel may be formed on an inner surface of the upper substrate 200.

The configuration of one embodiment will be described in detail with reference to FIG. 1.

In the organic light emitting display with the touch screen panel according to this embodiment, the first electrodes 212 of the touch screen panel and sensing lines 214 coupling the first electrodes 212 to an external touch driving circuit (not shown) through a first touch pad portion 119a are formed on one surface of the upper substrate 200 sealing the lower substrate 100 with respect to a plurality of pixels 120 formed on a display area 300 of the lower substrate 100.

The first electrodes 212 are formed on the display area 300, and the sensing lines 214 are formed on a non-display area positioned at the outside of the display area 300.

A plurality of signals and a plurality of control lines are coupled to the respective pixels 120 formed on the display area 300 of the lower substrate 100. The arrangement of scan and data lines 114 and 116 as the signal lines and initialization driving control lines 112 as control lines is shown in FIG. 1. Emission control lines may be additionally arranged to be coupled to the respective pixels 120. However, for convenience of illustration, the emission control lines are not shown in FIG. 1.

The initialization driving control lines 112 are arranged in parallel with the scan lines 114 in a first direction (X-axis direction). Like the scan lines, a plurality of pixels formed on a row line are coupled to the respective initialization driving control lines.

Each of the signal lines 114 and 116 and the control lines 112 is coupled to pad portions 118 and 119b, i.e., a driving pad portion 118 and a second touch pad portion 119b, and receives signals from an external driving circuits such as a scan driver, a data driver and a touch driving circuit through the pad portions 118 and 119b.

Similar to the second touch pad portion 119b formed on the lower substrate 100, the first touch pad portion 119a formed on the upper substrate 200 is coupled to the same touch driving circuit (not shown).

Thus, in a case where the touch driving circuit is electrically coupled to the second touch pad portion 119b formed on the lower substrate 100 by a flexible printed circuit board (FPCB) or the like, the first pad portion 119a formed on the upper substrate 200 is coupled to the second touch pad 119b formed on the lower substrate 100 through a conductive coupling member (not shown), such as, for example, a conductive ball or the like. Accordingly, a separate FPCB can be electrically coupled to the touch driving circuit without contacting the first touch pad portion 119a.

In this embodiment, the driving electrodes (second electrodes) of the touch screen panel, corresponding to the first electrodes 212 of the touch screen panel as sensing electrodes formed on one surface of the upper substrate 200 are used as the control lines 112 arranged on the lower substrate 100.

As shown in FIG. 1, the first electrodes 212 and the control lines 112 as the second electrodes are arranged in directions intersecting each other so that a plurality of sensing cells are formed at intersection portions of the first electrodes 212 and the control lines 112.

For example, if the first electrodes 212 are arranged in a second direction (Y-axis direction), the second electrodes 112 are arranged in the first direction (X-axis direction) intersecting the second direction.

Since the first electrodes 212 as the sensing electrodes formed on the upper substrate 200 have a width considerably wider than that of the control lines 112 formed on the lower substrate 100 as shown in FIG. 1, a plurality of adjacent control lines 112 may form one group. The plurality of control lines 112 constituting the group may be operated as driving electrodes.

In order to implement touch recognition through the sensing cells, a signal applied to the group of the control lines 112 operated as the driving electrodes (second electrodes) in the touch recognition is necessarily input in synchronization with a signal applied to each pixel so as not to have influence on the display.

Hereinafter, the circuit configuration of a pixel for implementing the touch recognition and the waveform of driving signals supplied to the pixel according to an embodiment of the present invention will be described with reference to FIGS. 2 and 3.

Figure 2:
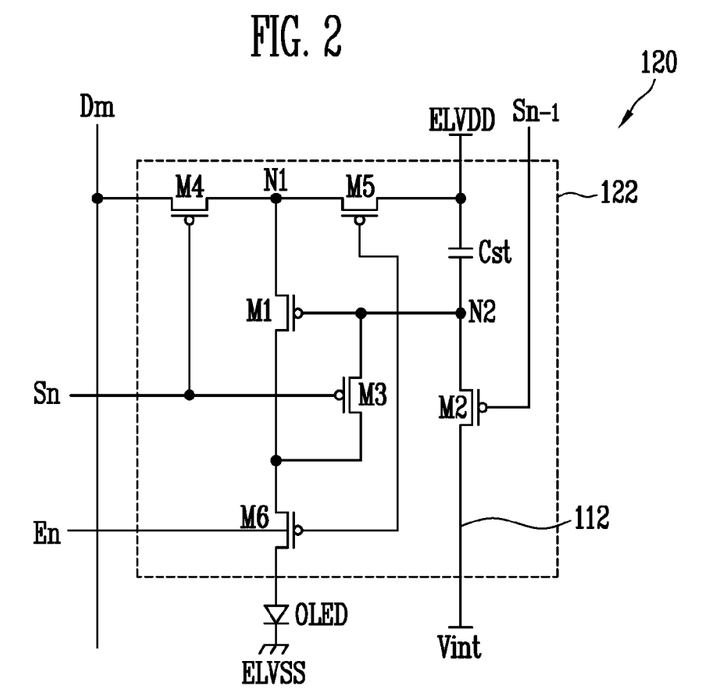
FIG. 2 is a circuit diagram illustrating an embodiment of a pixel shown in FIG. 1.

FIG. 2 is a circuit diagram illustrating an embodiment of the pixel shown in FIG. 1. FIG. 3 is a waveform diagram illustrating driving signals supplied to the pixel shown in FIG. 2.

The structure of the pixel shown in FIG. 2 is merely one embodiment, and the embodiments of the present invention are not limited thereto.

First, referring to FIG. 2, the pixel 120 according to this embodiment includes an organic light emitting diode OLED, and a pixel circuit 122 coupled to a data line Dm, scan lines Sn−1 and Sn, an emission control line En and an initialization driving control line 112 for supplying an initialization voltage Vint so as to control the amount of current supplied to the organic light emitting diode OLED.

An anode electrode of the organic light emitting diode OLED is coupled to the pixel circuit 122, and a cathode electrode of the organic light emitting diode OLED is coupled to a second power source ELVSS. The voltage of the second power source ELVSS is set to be lower than that of a first power source ELVDD. The organic light emitting diode OLED generates light with a predetermined luminance, corresponding to the amount of current supplied from the pixel circuit 122.

The pixel circuit 122 controls the amount of the current supplied to the organic light emitting diode OLED, corresponding to a data signal supplied to the data line Dm when a scan signal is supplied to the scan line Sn. To this end, the pixel circuit 122 includes first to sixth transistors M1 to M6 and a storage capacitor Cst.

A first electrode of the fourth transistor M4 is coupled to the data line Dm, and a second electrode of the fourth transistor M4 is coupled to a first node N1. A gate electrode of the fourth transistor M4 is coupled to the n-th scan line Sn. When the scan signal is supplied to the n-th scan line Sn, the fourth transistor M4 is turned on to supply, to the first node N1, the data signal supplied to the data line Dm.

A first electrode of the first transistor M1 is coupled to the first node N1, and a second electrode of the first transistor M1 is coupled to a first electrode of the sixth transistor M6. A gate electrode of the first transistor M1 is coupled to a second node N2. The first transistor M1 supplies, to the organic light emitting diode OLED, current corresponding to the voltage charged in the storage capacitor Cst.

A first electrode of the third transistor M3 is coupled to a second electrode of the second transistor M2, and a second electrode of the third transistor M3 is coupled to the second node N2. A gate electrode of the third transistor M3 is coupled to the n-th scan line Sn. When the scan signal is supplied to the n-th scan line Sn, the third transistor M3 is turned on to allow the first transistor M1 to be diode-coupled.

The second transistor M2 is coupled between the second node N2 and the initialization voltage Vint. A gate electrode of the second transistor M2 is coupled to the (n−1)-th scan line Sn−1. When the scan signal is supplied to the (n−1)-th scan line Sn−1, the second transistor M2 is turned on to supply the initialization voltage Vint to the second node N2.

A first electrode of the fifth transistor M5 is coupled to the first power source ELVDD, and a second electrode of the fifth transistor M5 is coupled to the first node N1. A gate electrode of the fifth transistor M5 is coupled to the emission control line En. When no emission control signal is supplied from the emission control line En, the fifth transistor M5 is turned on to allow the first power source ELVDD and the first node N1 to be electrically coupled to each other.

The first electrode of the sixth transistor M6 is coupled to the second electrode of the first transistor M1, and a second electrode of the sixth transistor M6 is coupled to the anode electrode of the organic light emitting diode OLED. A gate electrode of the sixth transistor M6 is coupled to the emission control line En. When no emission control signal is supplied from the emission control line En, the sixth transistor M6 is turned on to supply current from the first transistor M1 to the organic light emitting diode OLED.

As such, an operation of displaying a predetermined image is performed through the configuration of the pixel shown in FIG. 2 and the application of signals to the pixel.

The initialization voltage Vint is used to initialize the second node N2. To this end, the initialization voltage Vint is set to a voltage lower than that of the data signal.

In this embodiment, the initialization driving control lines 112, to which the initialization voltage is applied, also serve as driving electrodes of the touch screen panel.

Thus, the initialization voltage Vint applied to the initialization driving control lines 112 is not always applied as a low-level voltage lower than the data signal, but the low-level voltage is progressively applied as a touch driving signal to the initialization driving control lines 112 operated as the driving electrodes for each predetermined group.

An example in which forty initialization driving control lines among the plurality of initialization driving control lines 112 arranged in the first direction (X-axis direction) form each group, and the group is operated as one driving electrode (second electrode) will be described in reference to FIG. 3.

First to fortieth initialization driving control lines are operated as a first driving electrode, and forty-first to eightieth initialization driving control lines are operated as a second driving electrode. Sequentially, groups each configured with initialization driving control lines having the same number are progressively operated as subsequent driving electrodes.

In this case, the initialization driving control lines 112 are arranged in parallel with the scan lines Sn and Sn−1. Like the scan lines, each of the plurality of pixels formed on a row line is coupled to one initialization driving control line.

Accordingly, a low-level initialization voltage Vint is applied only during a period in which a scan signal S(n−1) is applied to forty row lines coupled to the respective driving electrodes, and a high-level voltage is applied during the other periods.

Figure 3:
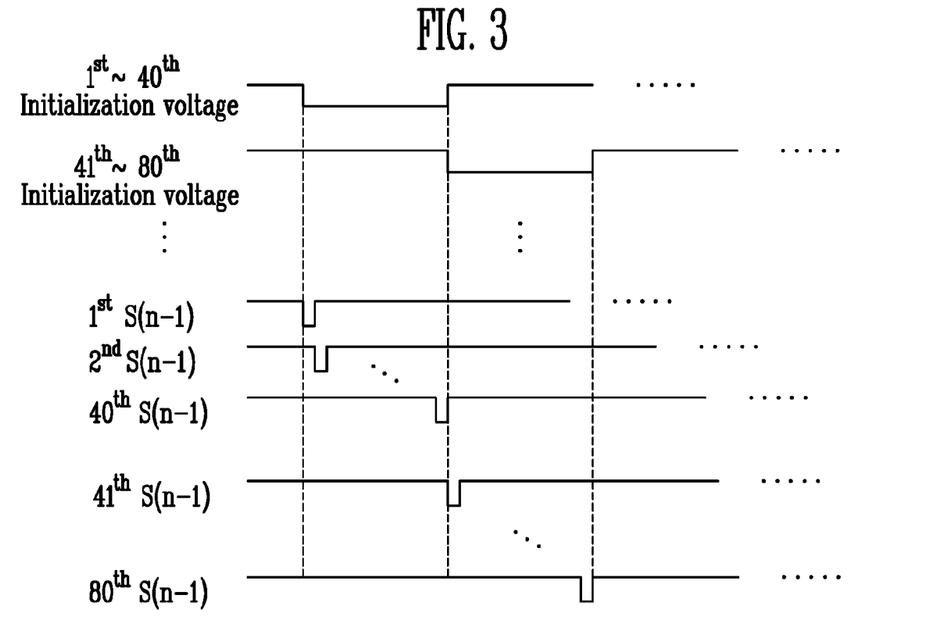
FIG. 3 is a waveform diagram illustrating driving signals supplied to the pixel shown in FIG. 2.

Thus, since the low-level initialization voltage applied to each driving electrode is progressively applied for each group of initialization driving control lines as shown in FIG. 3, the low-level initialization voltage can be used as a driving signal of the touch screen panel.

Since the low-level initialization voltage is applied to the pixels coupled to row lines to which the scan signal S(n−1) is applied, the low-level initialization voltage can be used to initialize the second node N2 of the pixel shown in FIG. 2. Since data is still not recorded in pixels coupled to the row lines to which the scan signal is not applied yet, the low-level initialization voltage is not applied. Although the high-level voltage is applied, there is no problem in displaying an image.

As illustrated in the signal waveform shown in FIG. 3, the low-level initialization voltage is progressively applied in synchronization with the scan signal applied to row lines corresponding to each group of driving electrodes, so that it is possible to implement display and touch recognition at the same time.

In the aforementioned embodiment of the present invention, the sensing electrodes 212 formed on the upper substrate 200 have a width considerably wider than that of the driving electrodes, i.e., the initialization driving control lines 112, formed on the lower substrate 100. Therefore, the touch recognition sensitivity of touch screen panel may be degraded as compared with a touch screen panel configured with sensing and driving electrodes having the same width.

Further, a long spacing distance between the initialization driving control lines 112 and the sensing electrodes 212 may result in the degradation of the touch recognition sensitivity.

Accordingly, in this embodiment, to solve such a problem, the initialization driving control lines 112 used as the driving electrodes are arranged close to the sensing electrodes 212 and electrically coupled to auxiliary lines having a width wider than that of the initialization driving control lines 112.

Figure 4:
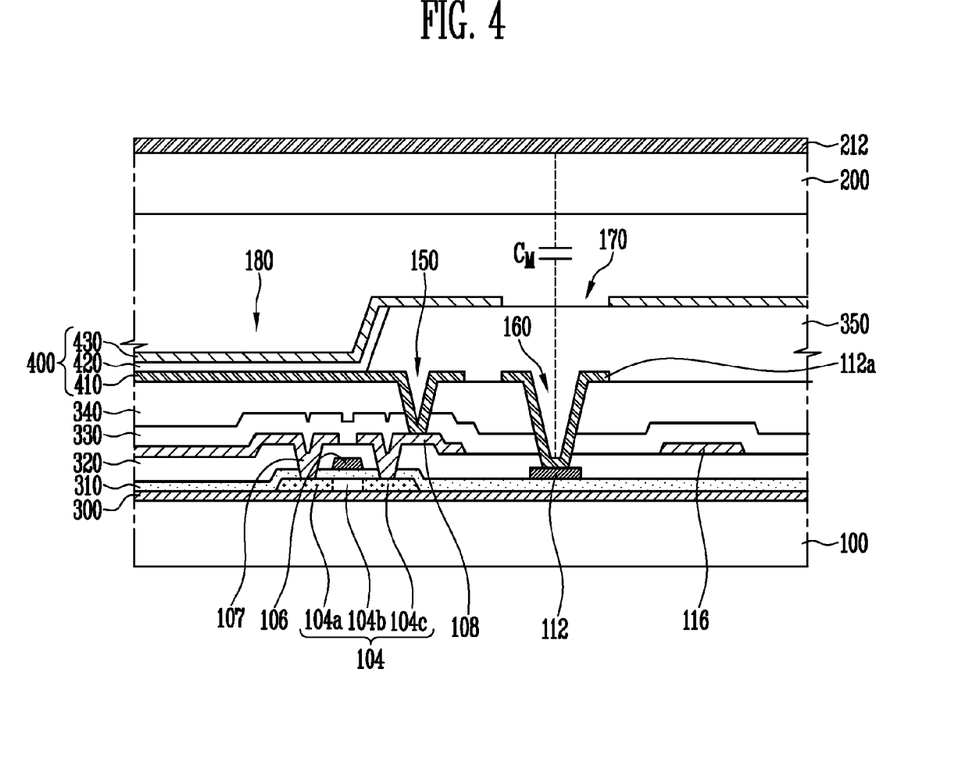
FIG. 4 is a sectional view illustrating a partial region of the organic light emitting display integrated with the touch screen panel according to the embodiment of the present invention.

FIG. 4 is a sectional view illustrating a partial region of the organic light emitting display integrated with the touch screen panel according to an embodiment of the present invention.

Figure 5A:
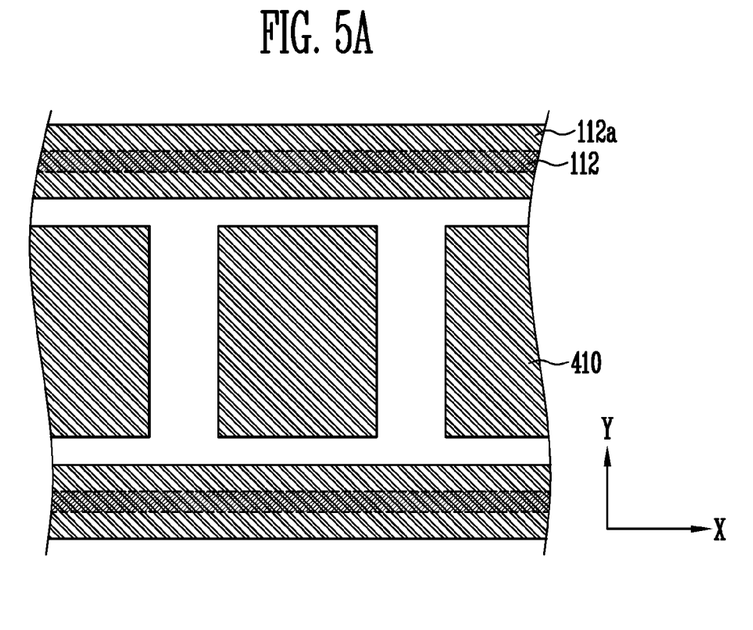
FIGS. 5A and 5B are plan views schematically illustrating some of auxiliary lines according to an embodiment of the present invention.
Figure 5B:
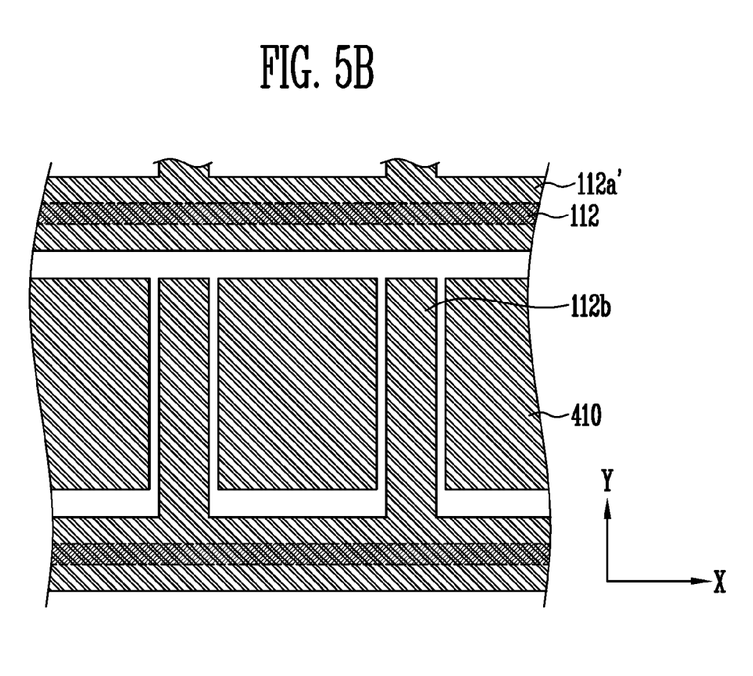

FIGS. 5A and 5B are plan views schematically illustrating some of auxiliary lines according to an embodiment of the present invention.

An organic light emitting diode OLED 400 and a transistor coupled thereto in the pixel shown in FIG. 2, and an initialization driving control line 112 operated as a driving electrode of the touch screen panel are shown in FIG. 4.

Referring to FIG. 4, a buffer layer 300 is first formed on a lower substrate 100. In this case, the lower substrate 100 may be a glass, plastic, quartz, silicon or metal substrate, and the buffer layer 300 may be a silicon oxide layer ($SiO_2$), silicon nitride layer ($SiN_x$), silicon oxynitride layer ($SiO_2N_x$) or multi-layer thereof.

A semiconductor layer 104 is formed on the buffer layer 300. The semiconductor layer 104 may be an amorphous silicon layer (a-Si) or poly silicon layer (poly-Si) obtained by crystallizing the amorphous silicon layer. Preferably, the semiconductor layer 104 is a poly silicon layer having high charge mobility.

A gate insulation layer 310 is formed on the entire surface of the lower substrate 100 including the semiconductor layer 104. The gate insulation layer 310 may be a silicon oxide layer ($SiO_2$), silicon nitride layer ($SiN_x$), silicon oxynitride layer ($SiO_2N_x$) or multi-layer thereof.

A gate electrode 106 of the transistor is formed in a region on the gate insulation layer 310 overlapping with the semiconductor layer 104, and the initialization driving control line 112 is also formed in the same layer as the gate electrode 106 as shown in FIG. 4.

When the gate electrode 106 and the initialization driving control line 112 are formed, scan lines (114 of FIG. 1) may be simultaneously formed.

Subsequently, source/drain regions 104a/104c are respectively formed in regions not overlapping with the gate electrode 106 on the semiconductor layer 104 by injecting conductive impurities (n+ ions or p+ ions) into the semiconductor layer 104 using the gate electrode 106 as a mask. A channel region 104b is defined between the source/drain regions 104a/104c.

An interlayer insulation layer 320 is formed on the entire surface of the lower substrate 100 on the gate electrode 106 and the initialization driving control line 112. A contact hole having the semiconductor layer 104 exposed therethrough is formed in the interlayer insulation layer 320 and the gate insulation layer 310.

Source/drain electrodes 107/108 of the transistor and a data line 116 are formed by laminating a conductive layer on the interlayer insulation layer 320 having the contact hole formed therein and then patterning the conductive layer.

The semiconductor layer 104, the gate insulation layer 310, the gate electrode 106, the source electrode 107 and the drain electrode 108 constitute a transistor. In the structure of the pixel shown in FIG. 2, the transistor may be an emission control transistor M6 for supplying a predetermined driving current to the organic light emitting diode OLED 400. However, the embodiments of the present invention are not limited thereto.

A passivation layer 330 is formed on the entire surface of the lower substrate 100 including the source and drain electrodes 107 and 108 patterned with the conductive layer and the data line 116. The passivation layer 330 may be a silicon oxide layer ($SiO_2$), silicon nitride layer ($SiN_x$) or multi-layer thereof. Preferably, the passivation layer 330 is a silicon nitride layer ($SiN_x$) that protects the lower transistor by effectively blocking gas and moisture, and contains abundant oxygen so as to protect incomplete bonding at the grain boundary of the poly silicon layer.

A planarization layer 340 implemented as an organic layer is formed on the passivation layer 330 so as to reduce a step difference. The planarization layer 340 may be a benzocyclobutene (BCB) layer, polyimide layer or polyacrylic layer.

A first via-hole 150 is formed in the passivation layer 330 and the planarization layer 340, overlapping with the drain electrode 108 of the transistor. The drain electrode 108 is exposed through the first via-hole 150.

An anode electrode 410 of the organic light emitting diode OLED is formed on the planarization layer 340 including the first via-hole 150 so as to be electrically coupled to the exposed drain electrode 108.

The anode electrode 410 may be formed using a conductive layer with a light reflection property. For example, the light reflection conductive layer may be Ag, Al, Ni, Pt, Pd or alloy thereof, which has a high work function, or may be Mg, Ca, Al, Ag, Ba or alloy thereof, which has a low work function.

Alternatively, in a case where a reflection layer pattern (not shown) is further formed beneath the anode electrode 410 before the anode electrode 410 is formed, the anode electrode 410 may be formed using a light transmissive conductive layer. The light transmissive conductive layer may be an indium tin oxide (ITO) layer or indium zinc oxide (IZO) layer.

A pixel defining layer (PDL) 350 is formed on the entire surface of the lower substrate 100 including the anode electrode 410. The PDL 350 may be formed using BCB, acryl-based photoresist, phenol-based photoresist or imide-based photoresist.

The PDL 350 is used to separate adjacent pixels from each other. An opening 180 through which a partial region of the anode electrode 410, i.e., an emission region is exposed, is formed in the PDL 350 through etching or the like. An organic emission layer 420 is formed on the exposed anode electrode 410 in the opening 180.

The organic emission layer 420 may be formed using vacuum deposition, inkjet printing or laser thermal transfer. Further, a hole injection layer, hole transportation layer, hole blocking layer, electron transportation layer or electron injection layer may be formed on or beneath the organic emission layer 420 in some embodiments.

A cathode electrode 430 is formed on the entire surface including the organic emission layer 420 and the PDL 350. The cathode electrode 430 is preferably formed with a transparent conductive layer. The transparent conductive layer may be an ITO or IZO layer, or may be Mg, Ca, Al, Ag, Ba or alloy thereof, which has a thickness thin enough to transmit light therethrough.

The organic light emitting diode OLED 400 formed for each pixel is implemented through the stacked structure of the cathode electrode 410, the organic emission layer 420 and the cathode electrode 430.

The organic light emitting diode OLED 400 is sealed by the upper substrate 200, and accordingly, the upper substrate 200 is referred to as an encapsulation substrate.

In this embodiment, as described with reference to FIGS. 1 to 3, the sensing electrodes (first electrodes) 212 of the touch screen panel are formed on the one surface of the upper substrate 200, and the control lines arranged on the lower substrate 100, i.e., the initialization driving control lines 112, are used as the driving electrodes of the touch screen panel, so that it is possible to implement the organic light emitting display integrated with the touch screen panel having a thin thickness without any additional process.

However, the spacing distance between the first electrodes 212 as the sensing electrodes formed on the upper substrate 200 and the initialization driving control lines 112 as the driving electrodes formed on the lower substrate 100 is long, and the width of the initialization driving control lines 112 is considerably narrower than that of the sensing electrodes 212. Therefore, the touch recognition sensitivity of the touch screen panel is degraded.

Accordingly, in this embodiment, to solve such a problem, the initialization driving control lines 112 used as the driving electrodes are arranged close to the sensing electrodes 212 and electrically coupled to auxiliary lines 112a having a width wider than that of the initialization driving control lines 112 as shown in FIG. 4. Thus, the initialization driving control lines 112 and the auxiliary lines 112a electrically coupled thereto are used as the driving electrodes of the touch screen panel.

More specifically, referring to FIG. 4, a second via-hole 160 is formed in the insulation layers formed on the region overlapping with the initialization driving control line 112, i.e., the interlayer insulation layer 320, the passivation layer 330 and the planarization layer 340. The initialization driving control line 112 is exposed through the second via-hole 160.

The auxiliary line 112a is formed on the planarization layer 340 including the second via-hole 160 so as to be electrically coupled to the exposed initialization driving control line 112.

The auxiliary line 112a is formed in the same layer as the anode electrode 410 of the organic light emitting diode OLED described above. The auxiliary line 112a may be made of the same material as the anode electrode 420.

As shown in FIG. 4, the auxiliary line 112a is electrically separated from the anode electrode 410. The auxiliary line 112a may be formed in a region overlapping with the PDL 350.

Thus, the auxiliary line 112a is electrically coupled to the initialization driving control line 112 used as the driving electrode of the touch screen panel, regardless of the operation of displaying an image in the organic light emitting display, so that it is possible to prevent a resistive-capacitive (RC) delay of the driving electrode. Further, the distance of the auxiliary line 112a from the sensing electrode 212 formed on the upper substrate 200 is further shortened, thereby improving the touch recognition sensitivity.

In FIG. 4, the auxiliary line 112a is formed in the region overlapping with the initialization driving control line 112. Although the auxiliary line 112a is formed in a stripe shape having a width wider than that of the initialization driving control line 112, the embodiments of the present invention are not limited thereto. In addition to the stripe shape, the auxiliary line 112a may be formed in various shapes such as a mesh shape, which can increase the area thereof.

An embodiment in which the auxiliary line 112a is formed in the stripe shape having a width wider than that of the initialization driving control line 112 is shown in FIG. 5A.

The auxiliary line 112a is disposed in the same first direction (X-axis direction) in the region overlapping with the initialization driving control line 112. The auxiliary line 112a is formed in the same layer as the anode electrode 410.

The auxiliary line 112a is disposed in a direction intersecting the first electrode (212 of FIG. 1) as the sensing electrode of the touch screen panel. The auxiliary line 112a may also be disposed in parallel with the scan lines (114 of FIG. 1) formed on the display area of the lower substrate 100.

The embodiment shown in FIG. 5B has a structure in which the area of the auxiliary line 112a is further increased. When comparing the embodiment of FIG. 5B with the embodiment of FIG. 5A, auxiliary lines 112a' arranged in the first direction may be further provided with at least one protrusion 112b protruded in the region between the anode electrodes 410.

The protrusions 112b are protruded in the second direction (Y-axis direction) perpendicular to the first direction. Since the anode electrodes 410 are formed to be separated from each other for each pixel region as shown in FIG. 5B, the protrusion 112b of the auxiliary line 112a' may be further formed in the region between the separated anode electrodes 410.

The auxiliary lines 112a used as the driving electrodes of the touch screen panel and the auxiliary lines 112a electrically coupled to the respective initialization driving control lines 112 may be implemented as a plurality of groups arranged in the first direction (X-axis direction) on the lower substrate 100. The sensing electrode corresponding to the driving electrodes 112 and 112a may be implemented as the first electrode 212 formed in the second direction (Y-axis) intersecting the first direction on the one surface of the upper substrate 200.

The insulation layer, the upper substrate 200 or the like, provided between the driving electrodes 112 and 112a and the sensing electrode 212 serves as a dielectric substance.

Since the embodiments provide the organic light emitting display, the cathode electrode 430 of the organic light emitting diode OLED is formed on the entire surface of the lower substrate 100 including the driving electrodes 112 and 112a as shown in FIG. 4.

It may be difficult to form an electric field between the driving electrodes implemented with the initialization driving control lines 112 and the auxiliary lines 112a and the sensing electrodes on the upper substrate 200. Accordingly, in this embodiment, an opening 170 is formed in a region of the cathode electrode 430, overlapping with the auxiliary line 112a so that the driving electrodes 112 and 112a are exposed therethrough.

Mutual capacitance $C_M$ between the driving electrodes 112 and 112a and the sensing electrode 212 is formed at intersection portions of the driving electrodes 112 and 112a and the sensing electrode 212 by the arrangement of the driving electrodes 112 and 112a and the sensing electrode 212. Each intersection portion at which the mutual capacitance is formed serves as a sensing cell implementing the touch recognition.

In a case where a driving signal is applied to the driving electrodes 112 and 112a coupled to each sensing cell, the mutual capacitance formed in each sensing cell generates a sensing signal coupled to the sensing electrodes 112 and 112a coupled to each sensing cell.

As described with reference to FIG. 3, driving signals are progressively applied to the driving electrodes 112 and 112a during one frame period. That is, if the low-level initialization voltage Vint as a driving signal is applied to any one of the driving electrodes, the high-level voltage is applied to the other driving electrodes.

Thus, mutual capacitances are respectively formed at a plurality of intersection portions of a plurality of sensing electrodes 212 intersecting the driving electrodes 112 and 112a to which the driving signal is applied. In a case where a finger or the like contacts the sensing cells, a change in capacitance occurs in the sensing cell contacted with the finger or the like, thereby sensing the contact.

The embodiments of the present invention configured as described above can implement a mutual capacitive organic light emitting display integrated with a touch screen panel.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display integrated with a touch screen panel comprising a plurality of first electrodes, said display comprising:
a first substrate on which a plurality of pixels, a plurality of signal lines and a plurality of control lines are arranged, wherein each of the plurality of signal lines and each of the plurality of control lines are coupled to a respective pixel of the plurality of pixels, wherein each pixel includes an organic light emitting diode;
a second substrate on the first substrate to seal the first substrate;
first electrodes arranged on a surface of the second substrate with the second substrate interposed between the first electrodes and the first substrate; and
a plurality of auxiliary lines, each of the plurality of auxiliary lines electrically coupled to a respective control line of the plurality of control lines, wherein a cathode electrode of the organic light emitting diode is provided between the plurality of auxiliary lines and the first electrodes, and the cathode electrode has an opening formed in a region overlapping with the auxiliary lines and with the control lines to expose the entirety of the respective auxiliary lines,
wherein each of the plurality of control lines and each of the plurality of auxiliary lines are arranged in a direction intersecting a respective first electrode so as to function as a second electrode of the touch screen panel, and
wherein each of the plurality of auxiliary lines directly contacts each of the plurality of control lines.

2. The organic light emitting display of claim 1, wherein each of the auxiliary lines are formed to have a width wider than that of each of the control lines electrically coupled thereto.

3. The organic light emitting display of claim 1, wherein the auxiliary lines are formed in the same layer as an anode electrode of an organic light emitting diode provided in each pixel.

4. The organic light emitting display of claim 3, wherein the auxiliary lines are made of the same material as the anode electrode.

5. The organic light emitting display of claim 1, wherein the auxiliary lines are configured to be separated from the anode electrode.

6. The organic light emitting display of claim 5, wherein the auxiliary lines is further provided with at least one protrusion protruded to a region between the anode electrodes.

7. The organic light emitting display of claim 1, wherein a plurality of adjacent control lines form one group, and each of the plurality of control lines constituting the group is operated as the second electrode of the touch screen panel.

8. The organic light emitting display of claim 7, wherein the control lines are coupled to the touch driving circuit through a second touch pad portion formed on a non-display area of the first substrate.

9. The organic light emitting display of claim 1, wherein the first electrode is a sensing electrode of the touch screen panel, and the second electrode is a driving electrode of the touch screen panel.

10. The organic light emitting display of claim 1, wherein the first electrodes are formed on a display area of the second substrate, corresponding to the region on which the pixels are formed.

11. The organic light emitting display of claim 10, wherein sensing lines through which the first electrodes are coupled to a touch driving circuit through a first touch pad portion are further formed on a non-display area positioned at the outside of the display area.

12. The organic light emitting display of claim 11, wherein the first touch pad portion formed on the second substrate is coupled to the same touch driving circuit as the second touch pad portion formed on the first substrate.

13. The organic light emitting display of claim 1, wherein the control lines comprise initialization driving control lines providing an initialization voltage to the respective pixels.

14. The organic light emitting display of claim 1, wherein each pixel includes:
   an organic light emitting diode;
   a first transistor configured to control the amount of current supplied to the organic light emitting diode, and having a gate electrode of which voltage is initialized by the initialization voltage; and
   a second transistor coupled between the gate electrode of the first transistor and the control line providing the initialization voltage.

15. The organic light emitting display of claim 14, wherein the initialization voltage applied to the control line is lower than a data signal applied to each pixel.

16. The organic light emitting display of claim 15, wherein the initialization voltage is progressively applied for each group of control lines, operated as the second electrode of the touch screen panel.

17. The organic light emitting display of claim 16, wherein a high-level voltage is simultaneously applied to the other groups of control lines except the group of control lines to which the initialization voltage is applied.

18. An organic light emitting display integrated with a touch screen panel comprising a plurality of first electrodes, said display comprising:
   a first substrate on which a plurality of pixels, a plurality of signal lines and a plurality of control lines are arranged, wherein each of the plurality of signal lines and each of the plurality of control lines are coupled to a respective pixel of the plurality of pixels wherein each pixel includes:
      an organic light emitting diode;
      a first transistor configured to control the amount of current supplied to the organic light emitting diode, and having a gate electrode of which voltage is initialized by the initialization voltage, wherein the initialization voltage applied to the control line is lower than a data signal applied to each pixel, wherein the initialization voltage is progressively applied for each group of control lines and wherein a high-level voltage is simultaneously applied to the other groups of control lines except the group of control lines to which the initialization voltage is applied; and
      a second transistor coupled between the gate electrode of the first transistor and the control line providing the initialization voltage;
   a second substrate on the first substrate to seal the first substrate;
   first electrodes arranged on a surface of the second substrate with the second substrate interposed between the first electrodes and the first substrate; and
   a plurality of auxiliary lines, each of the plurality of auxiliary lines electrically coupled to a respective control line of the plurality of control lines,
   wherein each of the plurality of control lines and each of the plurality of auxiliary lines are arranged in a direction intersecting a respective first electrode so as to function as a second electrode of the touch screen panel.

* * * * *